Sept. 26, 1967   H. JUILLERAT   3,343,932
METHOD FOR MAKING A DIAMOND-CARRYING TOOL
Filed Oct. 5, 1964

ABSTRACT OF THE DISCLOSURE

United States Patent Office 3,343,932
Patented Sept. 26, 1967

3,343,932
METHOD FOR MAKING A DIAMOND-CARRYING TOOL
Henri Juillerat, 9 Rue du Chanet, Bole, Switzerland
Filed Oct. 5, 1964, Ser. No. 401,553
Claims priority, application Switzerland, Oct. 3, 1963, 12,175/63
1 Claim. (Cl. 51—293)

ABSTRACT OF THE DISCLOSURE

Method for making a tool having diamond chips carried on a part of it by positioning the chips on an adhesive coating deposited on a first metal support with the cutting edges of the chips projecting outwardly from the coating, embedding the projecting cutting edges of the chips into a coating of synthetic thermosetting resin deposited on a second support, heating the synthetic resin to set the resin, removing the first support and the glue after the resin has set, applying a liquid metal coating to the chips while the cutting edges thereof are still embedded in the resin, removing the coating of resin and the first support from the liquid metal coating after it has hardened to form a third support and attaching the third support to the part of the tool.

---

It is essential to resort to very hard tools for the machining of rubies, sapphires, quartz, spinels and also ceramic ware and metal carbides and also for cutting certain comparatively soft materials such as plastic materials, copper or hard rubber. Of all known substances, only diamond is used for such work.

For operating with soft materials, cutting tools have been made which include a support or body to which is secured a cutting plate made of diamond. The high price of diamond limits its use to very small tools and to limited operations such as turning on the lathe, and faceting.

When working with very hard materials, a so-called industrial diamond is used which is agglomerated by means of a plastic or metal binder. In particular tools have been proposed wherein diamond chips are held together by means of bronze or plastic material. The melting temperature of bronze approximating that at which diamond begins being oxidized, the heating destroys the cutting edges of the chips. Said tools lose thus a large portion of their cutting properties and can only be used as abrading tools. Furthermore, the size of the chips is not uniform and their irregular distribution in the binder still further reduces the cutting capacity of such tools to a considerable extent.

My invention has for its object a method for producing tools made of diamond chips secured to a support and according to my invention the chips which have been previously uniformly distributed and set on the surface of the support are secured together and to the support through metallization.

My invention has for its object the tools obtained according to said method.

The accompanying drawing illustrates two embodiments of my improved method.

Figure 3:
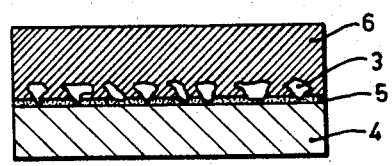
Figure 4:
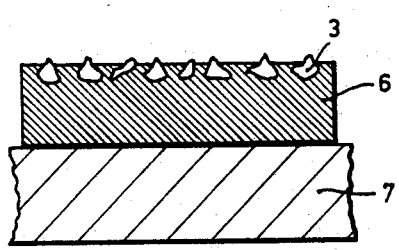
Figure 5:
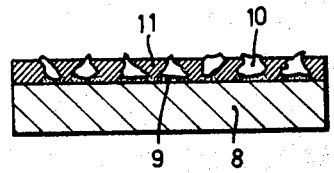

FIGS. 1 to 4 illustrate four stages of a first embodiment, FIG. 5 relates to the second embodiment.

Figure 1:
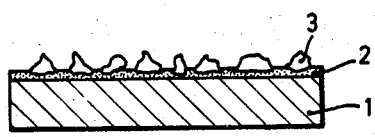
Figure 2:
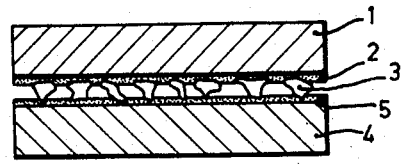

Turning to FIG. 1, the upper surface of a yielding support 1 which matches that of the tool to be obtained is coated with a film of glue. The diamond chips 3 are then laid and angularly set on said adhesive surface, care being taken to distribute the chips in a uniform manner. A second support 4 is then prepared (FIG. 2) and coated with a layer of a thermosetting synthetic resin 5. Said support 4 is then laid on the diamond chips so that the cutting edges of the latter may engage the resin layer. The chips subjected to a slight pressure enter the resin layer until their cutting edges meet the surface of the support 4. The whole arrangement thus obtained is heated so as to set the resin. After this setting, the support 1 is removed and the surface of the support 4 carrying the chips through their cutting edges is subjected to metallization over a depth sufficient for the chips to be completely embedded in metal as shown at 6 (FIG. 3). The metallization is obtained by projecting molten metal in the conventional manner by means of a spray gun.

The metallized support 4 is then mechanically separated from the chips embedded in the binder formed by the metal layer 6 (FIG. 4). The metal layer above which the cutting edges of the chips project is then secured at the side opposed to the chips to the tool support 7 (FIG. 4) by hard-soldering or possibly by gluing by means of a synthetic resin.

Thus my improved method provides for an even distribution of the cutting edges on a single surface which requires no touching up before use of the tool. The cutting edges operate thus simultaneously and bestow the tool with a large cutting capacity and with a high resistance to wear.

In the simplified embodiment illustrated in FIG. 5, the surface 8 of the tool support is used as a primary support. It is first sanded and then coated by means of a layer of synthetic resin 9 on which the chips 10 are distributed and angularly set in the manner disclosed with reference to FIG. 1. A further sanding removes then the resin lying between the chips and this is followed by a metallization, care being taken in this case to obtain a thickness of metal 11 which is smaller than the height of the chips so that the cutting edges of the latter project alone above the metal embedding the chips.

As in the first embodiment, the diamond chips are connected by a metal body without it being necessary to heat the diamond chips to the melting temperature of the metal embedding them. The metallizing stage thus ensures adherence between the binder and the tool support, whatever metal is used.

My improved method is applicable both to flat tools and to cylindrical tools. It is thus possible to manufacture rotary tools which can cut both along their edge and along their periphery. Both embodiments disclosed allow obtaining tools of which only the operative areas carry diamonds, which allows reducing the amount of diamond chips used and consequently the cost price of the tool.

What I claim is:

A method for producing a tool having diamond chips carried on a part thereof comprising the steps of providing a first support, placing a coating of glue thereon and positioning diamond chips having cutting edges on said coating with said cutting edges projecting outwardly from said coating, depositing a synthetic thermosetting resin on a second support, embedding said projecting cutting edges of said chips into said coating on said second support, heating said synthetic thermosetting resin to set the same, removing said first support and said glue after said resin has set, applying a liquid metal coating to said chips while said cutting edges are still embedded in said resin, removing said resin coating and said first support from said liquid metal coating after said liquid metal coating has hardened to form a third support, and attaching said third support to said part of said tool.

References Cited

UNITED STATES PATENTS

| | | | |
|---|---|---|---|
| 2,292,991 | 8/1942 | Crompton | 51—308 |
| 2,367,286 | 1/1945 | Keeleric | 51—309 |
| 2,368,473 | 1/1945 | Keeleric | 51—309 |
| 2,904,418 | 9/1959 | Fahnoe | 51—293 |
| 2,906,612 | 9/1959 | Anthony et al. | 51—309 |
| 3,295,941 | 1/1967 | Spellman | 51—308 |

ALEXANDER H. BRODMERKEL, *Primary Examiner.*

ROBERT C. RIORDON, DANIEL J. ARNOLD,
*Examiners.*

D. G. KELLY, *Assistant Examiner.*